United States Patent
Wittig et al.

(10) Patent No.: US 10,549,500 B2
(45) Date of Patent: Feb. 4, 2020

(54) ADHESIVE TAPE HAVING A STITCH-BONDED NONWOVEN CARRIER

(71) Applicant: Coroplast Fritz Müller GmbH & Co. KG, Wuppertal (DE)

(72) Inventors: Gülay Wittig, Bochum (DE); Guido Vorwerk, Warendorf (DE); Christoph Lodde, Hozwickede (DE)

(73) Assignee: Coroplast Fritz Müller GmbH & Co. KG, Wuppertal (DE)

( * ) Notice: Subject to any disclaimer, the term of this patent is extended or adjusted under 35 U.S.C. 154(b) by 123 days.

(21) Appl. No.: 14/757,694

(22) Filed: Dec. 23, 2015

(65) Prior Publication Data

US 2016/0176155 A1  Jun. 23, 2016

(30) Foreign Application Priority Data

Dec. 23, 2014  (DE) .......................... 10 2014 119 521

(51) Int. Cl.
| | |
|---|---|
| *B32B 5/10* | (2006.01) |
| *B32B 5/02* | (2006.01) |
| *B32B 27/12* | (2006.01) |

(52) U.S. Cl.
CPC ............... *B32B 5/10* (2013.01); *B32B 5/022* (2013.01); *B32B 27/12* (2013.01); *B32B 2262/0261* (2013.01); *B32B 2262/0276* (2013.01); *B32B 2405/00* (2013.01)

(58) Field of Classification Search
CPC ............. B32B 5/10; B32B 5/022; C09J 7/21
USPC .................................................. 442/335, 150
See application file for complete search history.

(56) References Cited

U.S. PATENT DOCUMENTS

| | | | | |
|---|---|---|---|---|
| 4,725,487 | A * | 2/1988 | Pemrick | B24D 11/02 422/148 |
| 5,496,603 | A * | 3/1996 | Riedel | D04H 1/46 428/41.5 |
| 6,451,146 | B1 * | 9/2002 | Ganschow | C09J 7/04 156/164 |
| 6,630,227 | B1 * | 10/2003 | Himmelsbach | B05B 12/24 428/156 |
| 2009/0139637 | A1* | 6/2009 | Kopf | B32B 7/12 156/187 |
| 2009/0291303 | A1* | 11/2009 | Kopf | C09J 7/04 428/365 |
| 2012/0227894 | A1 | 9/2012 | Siebert et al. | |

FOREIGN PATENT DOCUMENTS

| | | |
|---|---|---|
| DE | 102006006405 A1 | 8/2007 |
| DE | 202008013541 U1 | 1/2009 |
| EP | 0 668 336 B2 | 8/2001 |

OTHER PUBLICATIONS

Search Report from corresponding French application No. FR 1553595 dated Jan. 5, 2018 (6 pgs).
Coroplast Tapes Catalogue 2016, (96 pages).
Coroplast Adhesive Tape, Wire Harness Tapes, Fields of Application information, undated, (3 pages).

* cited by examiner

*Primary Examiner* — Peter Y Choi
(74) *Attorney, Agent, or Firm* — Brinks Gilson & Lione

(57) ABSTRACT

An adhesive tape includes a carrier having a stitch bonded nonwoven and an adhesive layer that is applied to one side of the carrier, wherein the stitch bonded nonwoven is formed from fibers, which are stitched with sewing threads. The adhesive tape has improved abrasion resistance while simultaneously avoiding flagging. The sewing threads may have a thread linear density of at least 80 dtex.

20 Claims, 2 Drawing Sheets

ADHESIVE TAPE HAVING A STITCH-BONDED NONWOVEN CARRIER

RELATED APPLICATIONS

This application claims priority to German Patent Application No. 10 2014 119 521.3, filed Dec. 23, 2014.

FIELD OF INVENTION

The invention relates to an adhesive tape including a carrier having a stitch bonded nonwoven and an adhesive layer that is applied to one side of the carrier, wherein the stitch bonded non-woven is formed from fibers, which are stitched with sewing threads.

A stitch bonded nonwoven is understood to refer to a textile fiber structure including a plurality of fiber layers that are stitched to one another by means of sewing thread.

BACKGROUND

An adhesive tape having a carrier that is formed from a stitch bonded nonwoven is known, for example from EP 0 668 336 B2. In addition, an adhesive tape of the above mentioned type is also sold under the product name, Coroplast 8579 X. The known types of adhesive tape are suitable for wrapping cable harnesses in motor vehicles, for example in order to avoid abrasion. Abrasion is caused when cables come into contact with the chassis or other parts, for example. The adhesive tapes of the type specified must meet the requirements of the unified standards in terms of their performance characteristics, in particular the Norm LV 312 (October 2009). This standard classifies adhesive tapes in terms of their properties for use in the automotive industry, preferably for bundling and wrapping cables and automotive wiring harnesses. The above mentioned standard was prepared by representatives from the automotive manufacturers, AUDI AG, BMW AG, Daimler AG, Porsche AG and Volkswagen AG. When the LV 312 standard is mentioned below, the corresponding October 2009 version is meant.

The performance characteristics of adhesive tapes include, for example, the adhesive strength on the reverse side of the tape and the unwinding force, as well as the ability to tear said tape manually. Additional performance characteristics include the adhesive strength on specific materials, the thickness, the elongation at break, the tensile strength, the tear propagation resistance and the abrasion resistance.

There are adhesive tapes with different abrasion properties, depending on the area of application.

To date, the convention has been to increase the thickness of the carrier material in order to improve, which is to say, reduce the abrasion. In so doing, however, it is necessary to take into account the fact that the stiffness of the adhesive tape will increase as a result, which makes the adhesive tape more prone to flagging. Flagging is the tendency for the end of an adhesive tape to stick out.

The object of the invention is to improve the usage properties of adhesive tapes known to date of the above-described type. In particular, an adhesive tape is to be provided having improved abrasion properties while maintaining a high noise damping.

BRIEF SUMMARY

An object of the invention is to improve the performance characteristics of previously known adhesive tapes of the above mentioned type. In particular, an adhesive tape having improved abrasion resistance while simultaneously avoiding flagging is disclosed herein.

In one embodiment, the sewing threads have a thread linear density of at least 80 dtex. As such, adhesive tapes having a nonwoven according to the invention may be thinner than adhesive tapes of the above mentioned type. As a result, the abrasion resistance and the tensile strength of the adhesive tape can be advantageously improved.

In an advantageous embodiment of the invention, the sewing threads have a thread linear density in the range of 80 dtex to 170 dtex, preferably in a range of 84 dtex to 167 dtex. Here, it has been shown that the tensile strength of the adhesive tape according to the invention can be adjusted by means of the thread size: The larger the thread size, the higher the force that must be applied in order to tear the adhesive tape (tensile strength) along the direction in which the adhesive tape extends. Larger thread sizes also have the advantage that the adhesive strength on reverse side of the tape can be reduced. It is also conceivable that stitch bonded nonwovens could be produced with sewing threads having a thread linear density of up to 220 dtex and even up to 330 dtex.

At least a portion of the sewing threads, and preferably all of the sewing threads, may advantageously be made in part or completely of polyester (PES), preferably polyethylene terephthalate (PET). Threads made of polyester are tear-resistant and weatherproof. In addition, the hygroscopic property of such threads, i.e. the tendency of fibers to absorb moisture, is advantageously low. Furthermore, it is thereby possible to produce adhesive tapes in which a greater tensile strength must be applied in order to tear the tape along the direction said tape extends, as compared to adhesive tapes of the type specified above.

In addition, it can be advantageous that at least a portion of the sewing threads, or even all of the sewing threads, are made in part or completely of polyamide. Polyamide threads that are stitched into the stitch bonded nonwoven can improve the tensile strength of the adhesive tape according to the invention as compared to the adhesive tapes of the prior art.

The sewing threads can be stitched into the stitch bonded nonwoven with a stitch length s in a range of 0.8 mm to 2.4 mm. In this case, stitch length is understood to refer to the spacing between the insertion point of the sewing needle into the raw fiber structure that forms the raw nonwoven and the exit of said needle. As such, stitching having a stitch length in a range of 1.0 mm to 1.6 mm, in particular in a range of 1.1 mm to 1.2 mm, represents a preferred range for stitching the sewing threads with the stitch bonded nonwoven. The "longitudinal stability", i.e. the resistance of the stitch bonded nonwoven against tearing along the direction in which said nonwoven extends, can be adjusted using the stitch length.

In particular, the sewing threads in the stitch bonded nonwoven can be stitched with a fineness in a range of F 7 to F 28, and preferably stitched in a range of F 14 to F 22.

The fineness F is indicated in units of n/25 mm and is a measure of the stitch density, wherein n is the number of stitch-forming needles. Said fineness is based on the "English fineness number," which, in a numbering system used in a knitting machine, indicates the number n of needles per one English inch (25.4 mm), and thus the stitch density. As such, this fineness F has been standardized in DIN ISO 8188:2009-02, "Textile machinery and accessories—Pitches of knitting machines."

Insofar as the sewing threads are commonly used to reinforce the stitch bonded nonwoven and to prevent individual fibers from being torn out when the adhesive tape is removed from the tape roll, the "transverse stability" perpendicular to the direction in which the adhesive tape extends can be advantageously adjusted using the fineness F.

The adhesive tape advantageously has an abrasion resistance in the Class D to Class E range in accordance with the LV 312 standard. This means that the adhesive tape can withstand, in particular, at least 1500 rub cycles, and preferably a number of rub cycles in a range of 1600 to 8000. An overview of the abrasion resistance ratings in accordance with the LV 312 standard (October 2009) is presented in the following Table 1.

TABLE 1

Classification according to abrasion properties in accordance with LV 312 (10/2009).

| Abrasion rating | Requirement |
| --- | --- |
| A no abrasion protection | <100 rub cycles |
| B low degree of abrasion protection | 100-499 rub cycles |
| C average degree of abrasion protection | 500-999 rub cycles |
| D high degree of abrasion protection | 1,000-4,999 rub cycles |
| E very degree of abrasion protection | 5,000-14,999 rub cycles |
| F extremely high degree of abrasion | 15,000-29,999 rub cycles |
| G abrasion protection for special | ≥30,000 rub cycles |

The adhesive tape according to the invention may, in particular, have a Class D noise reduction rating in accordance with the LV 312 standard. This categorization corresponds to a noise reduction that is greater than 10 dB(A) through and including 15 dB(A). An overview of the noise reduction rating system in accordance with the LV 312 standard (October 2009) is presented in the following Table 2.

TABLE 2

Classification according to noise abating properties in accordance with LV 312 (10/2009).

| Noise reduction rating | Requirement |
| --- | --- |
| A no noise reduction | 0 to ≤ 2 dB(A) |
| B low degree of noise reduction | >2 to ≤ 5 dB(A) |
| C average degree of noise | >5 to ≤ 10 dB(A) |
| D high degree of noise reduction | >10 to ≤ 15 dB(A) |
| E very high degree of noise | >15 dB(A) |

In addition, it can be advantageous that the adhesive tape have a tensile strength in the range of 55 N/cm to 120 N/cm in accordance with the LV 312 standard. As such, the tensile strength is a measure of the resilience of the adhesive tape.

In particular, the stitch bonded nonwoven has a tear propagation resistance of at least 30,000 mN in accordance with the LV 312 standard. The tear propagation resistance is hereby an influencing factor in the stability of the stitch bonded nonwoven as a carrier material for an adhesive tape.

The stitch bonded nonwoven preferably has an elongation at break in the range of 20% to 60% in accordance with the LV 312 standard. Like the tear propagation resistance, the elongation at break is an influencing factor in the stability of the stitch bonded nonwoven as a carrier material for an adhesive tape.

The stitch bonded nonwoven advantageously has a tensile strength in the range of 45 N/cm to 120 N/cm in accordance with the LV 312 standard.

In addition, it can be advantageous that at least a portion of the fibers of the nonwoven, and preferably all of the fibers, are made in part or completely of polyester (PES), in particular polyethylene terephthalate (PET). Polyester fibers are advantageous since such fibers are of low thickness, and have a high resilience and elongation at break, a very good dielectric behavior, low water absorption as well as low wear, for example.

The stitch bonded nonwoven preferably contains long fibers, wherein the long fibers have a fiber length in the range of 60 mm to 120 mm. The stitch bonded nonwoven may be made exclusively of different types of long fibers or a combination of long and short fibers. It is also conceivable that the stitch bonded nonwoven is made exclusively of short fibers. As such, the short fibers preferably have a fiber length in the range of 35 mm to 55 mm. The definition of long fibers and short fibers pursuant to the application thus differs from the definition used for natural fibers, according to which, short fibers have a length in the range of 40 mm to 100 mm, and long fibers have a length greater than 100 mm.

The thickness of a nonwoven can be adjusted by means of the percentage of long fibers and short fibers: The greater the percentage of long fibers contained in the nonwoven, the smaller the thickness of the nonwoven at the same grammage. In addition, the values for the elongation at break and the tensile strength increases as the percentage of long fibers in the nonwoven increases.

The long fibers advantageously have a fiber linear density in the range of 2 dtex to 5 dtex. In addition or alternatively, in particular, the short fibers have a fiber linear density in the range of 5 dtex to 8 dtex. Such fine fibers may have a lower intrinsic stability than thicker fibers of the same material. As a result, they can be better connected to other fibers. The basis for this is that the effective contact surface of such fibers, which is based on the ratio of fiber surface to fiber volume, is greater than it is in thicker fibers. This creates an increased level of stability in the nonwoven. In addition, fibers having similar fiber strengths as those of the long and short fibers are easier to connect with one another than fibers having different fiber strengths. Furthermore, similar strengths and associated bending behavior, both types of fibers advantageously have a similar connection behavior as adjacent fibers (provided it is the same material). It therefore follows that both types of fibers are able to influence the properties of the nonwoven formed therefrom in a similar manner, in particular the stability of said nonwoven.

In particular, the percentage of long fibers lies in a range of 60% to 80% and accordingly, the percentage of short fibers lies in a range of 40% to 20%. It follows that the properties of the stitch bonded nonwoven can be influenced more by the long fibers than by the short fibers.

In addition, it may be advantageous that the stitch bonded nonwoven has a grammage in the range of 200 g/m² to 260 g/m², preferably in a range of 210 g/m² to 250 g/m².

The stitch bonded nonwoven preferably has a thickness in a range of 1 mm to 1.6 mm, preferably in a range of 1.2 mm to 1.4 mm.

The adhesive layer advantageously has an application weight in the range of 100 g/m2 to 150 g/m2. In particular, said layer hereby includes additional pressure-sensitive adhesives, preferably a UV-cured polyacrylate.

In particular, the adhesive tape has an elongation at break in the range of 25% to 45% in accordance with the LV 312 standard.

BRIEF DESCRIPTION OF THE DRAWINGS

The invention shall be explained in greater detail based on the exemplary embodiments depicted in the drawings.

DETAILED DESCRIPTION OF THE DRAWINGS AND THE PRESENTLY PREFERRED EMBODIMENTS

Figures 1, 2A, 2B:
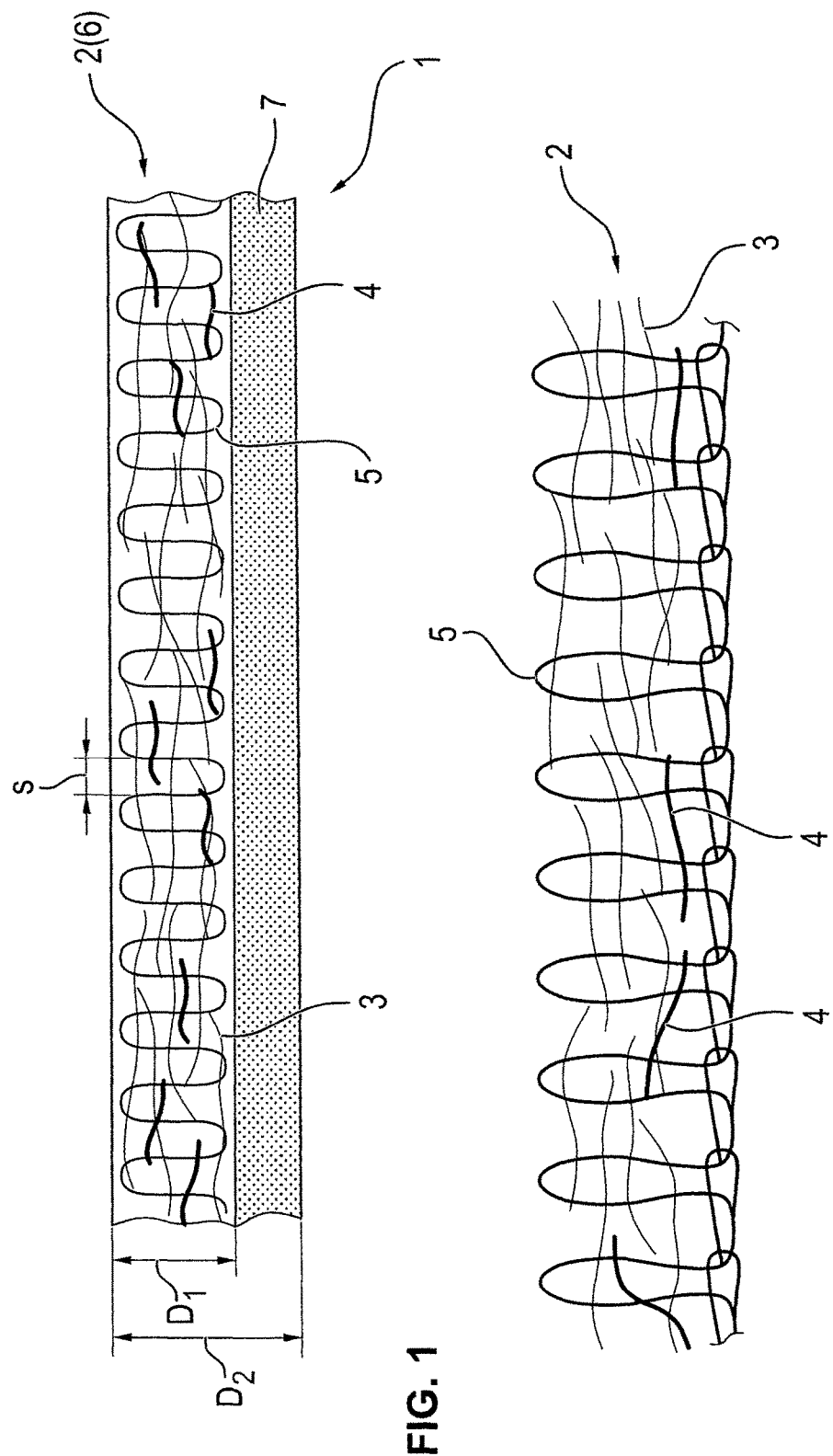
FIG. 1 is a schematic cross-section of an adhesive tape according to the invention having a stitch bonded nonwoven according to the invention.
FIG. 2a is a schematically depicted cross-section of a first embodiment of a stitch bonded nonwoven according to the invention having long fibers.
FIG. 2b is a view of a long fiber and a short fiber of the stitch bonded nonwoven according to the invention.

In the various Figures in the drawings, the same parts are designated using the same reference characters.

Concerning the following description, it is claimed that the invention is not limited to the exemplary embodiments and therefore, is not limited to all or a plurality of described combinations of features but rather, each individual partial feature of the/each exemplary embodiment is significant to the subject matter of the invention, separate from all other partial features described within this context, both individually and in combination with any features of another exemplary embodiment.

The parameters for the properties of the stitch bonded nonwoven 2 and of the adhesive tape 1 presented in the description are determined in accordance with the LV 312 standard (October 2009). These parameters for the stitch bonded nonwoven 2 include the thickness D1, the elongation at break, the tensile strength, the tear propagation resistance and the ability to tear said tape manually. These parameters for the adhesive tape 1 include the thickness D2, the elongation at break, the tensile strength, the adhesive strength on Stahl, the adhesive strength on the reverse side of the tape, the unwinding force, the ability to tear said tape manually, the noise reduction and the abrasion resistance. The above mentioned classification of the last two parameters is provided below.

FIG. 1 shows a schematic depiction of an adhesive tape 1 according to the invention, including a carrier 6 that is formed from a stitch bonded nonwoven 2, and an adhesive layer 7 that is applied to one side of the carrier 6. The carrier 6 is made exclusively of the stitch bonded nonwoven 2. The stitch bonded nonwoven 2 preferably includes a textile nonwoven material, which is a textiles sheeting material made of an ordered layering and/or non-ordered layering of fibers 3, 4. The nonwoven material may be made of longitudinal fibers that extend in the longitudinal direction of the tape and transverse fibers that extend perpendicular to the longitudinal fibers, or said material may be made of a disorganized layer of fibers.

The stitch bonded nonwoven 2 advantageously contains two types of fibers, i.e. long fibers 3 and short fibers 4. In particular, the fiber linear density of the long fibers 3 lies in the range of 2 dtex to 5 dtex. In addition or alternatively, in particular, the fiber linear density of the short fibers 4 lies in the range of 5 dtex to 8 dtex. In order to form the stitch bonded nonwoven 2, the long fibers 3 and/or the short fibers 4 are advantageously stitched with sewing threads 5. The sewing threads 5 are hereby advantageously sewn into the stitch bonded nonwoven 2 with stitch lengths of 1.2 mm.

The thread material of the sewing threads 5 may be made in part of completely of textile fibers. For example, yarns may be used, wherein yarns made of staple fibers or filaments may be used. A staple fiber yarn is made of endlessly long fibers, which are twisted during spinning. A filament yarn is made of filaments. A filament is a fiber of unlimited length (in accordance with the DIN 60,000 standard (October 1990)) or which has a length of at least 1,000 mm (in accordance with the DIN 60001 standard (October 1990)). Fibers of limited length, on the other hand, are referred to as spinning fibers. Spinning fibers, in turn, can be divided into staple fibers that can actually be spun and very short flock fibers, wherein the limit lies at 15 mm. The sewing threads 5 may also be produced as spinning fibers.

Smooth yarns are preferably used for the sewing threads 5, in particular so-called pre-oriented yarn or so-called fully-drawn yarn).

A filament yarn is produced by twisting the individual filaments. Thus the sewing threads 5 are preferably formed from 36 filaments. In general, the sewing threads may contain 5 of 24 to 144 filaments.

Figure 3:
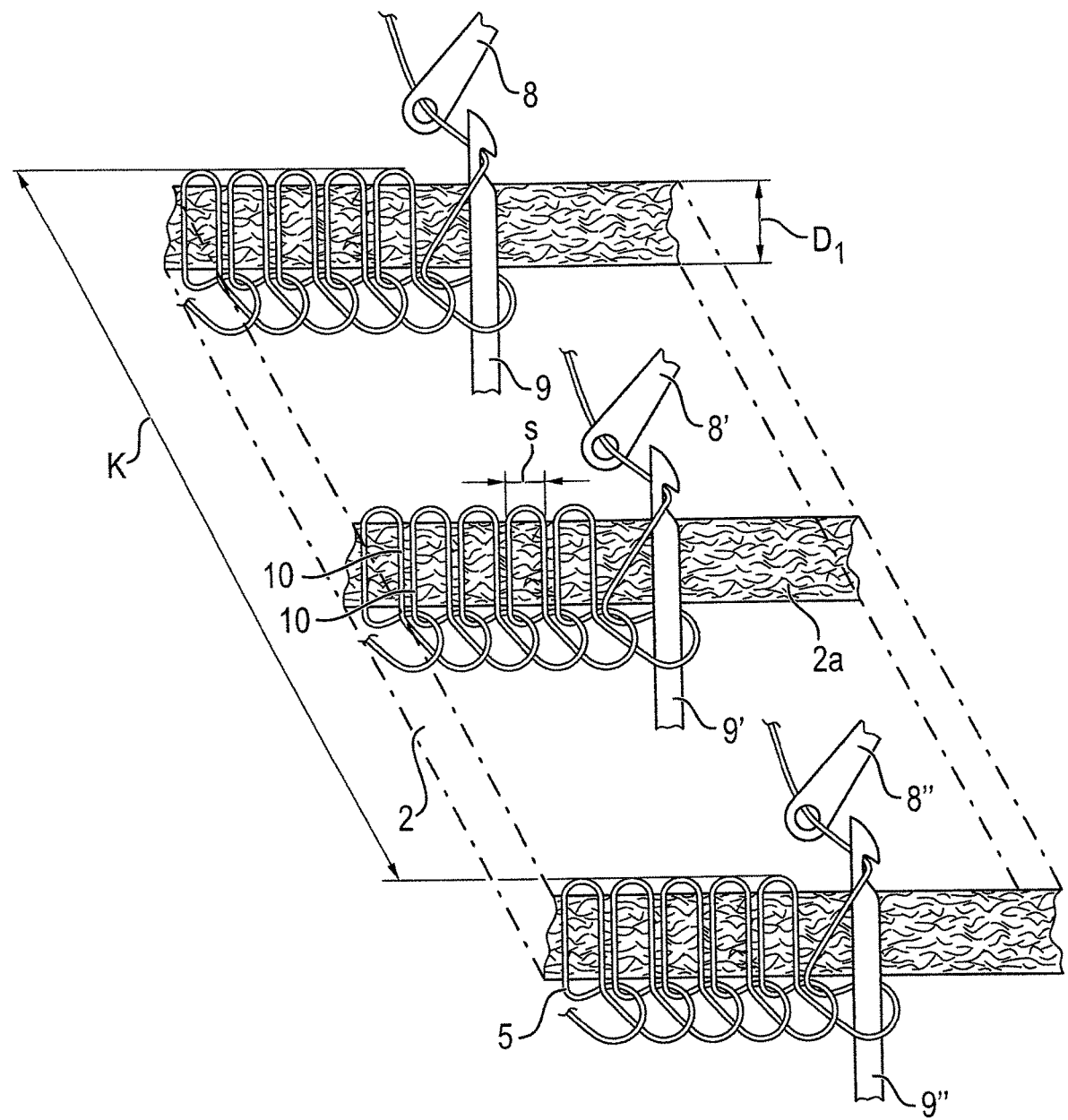
FIG. 3 is a top view of a stitch bonded nonwoven during production.

A stitch bonded nonwoven 2 is produced as schematically depicted in FIG. 3, for example. As such, FIG. 3 shows a schematic view of a stitch bonded nonwoven 2, which has been produced having fineness F 3 if the value of K is 25.4 mm. According to the "English fineness number", the number n of needles 9, 9', 9" per segment K of one English inch (25.4 mm), and thus the stitch density, are indicated. FIG. 3 shows a schematic depiction of a stitch bonded nonwoven 2, in which at least n=3 needles 9, 9', 9" disposed over a segment K were used to produce the stitch bonded nonwoven 2. According to the invention, fineness in the range of F 14 to F 22 is preferred.

For example, two sewing thread systems (e.g. two bars) are used to produce a stitch bonded nonwoven 2, in order to form stitches through a raw nonwoven 2a. A single bar or triple bar system is also possible, however. In the case of a two bar system, a sewing thread 5 is fed through a first set of movable sewing thread guides 8, 8', 8", which is passed through a first guide bar (not shown here) for an interacting, complete threaded engagement with the needles 9, 9', 9", etc. over the width of the raw nonwoven 2a.

In order to produce the meshes in the stitch bonded nonwoven 2, the sewing thread 5, in engagement with the needles 9, 9', 9", is moved during operation, which needles, in turn, guide the sewing thread 5 through the raw nonwoven 2a in a back and forth motion. As a result, an array of interacting sewing thread stitches 10 is formed, which extends in rows that are spaced apart from one another along the raw nonwoven 2a.

By way of example, but not limiting the claims of this application, the interacting sewing thread stitches 10 may be held in a complete chain-stitch configuration, although other stitching arrangements may be used such as tricot stitches and the like.

In particular, the stitch bonded nonwoven 2 may be produced using the "Maliwatt" stitch bonding technology. According to the Maliwatt method, a raw nonwoven 2a is reinforced in that said nonwoven is formed as a provided, transversely paneled fibrous web, or a random-fiber nonwoven, by stitching in one or more thread systems. To this end, a system including a compound needle and lock wire pierces the fiber sample and draws one or two inserted sewing threads 5 through the raw nonwoven 2a that is to be reinforced in a reverse movement. The preceding stitch is then cut off and the goods removed downward.

In particular, the stitch bonded nonwoven 2 has a grammage in the range of 210 g/m2 to 250 g/m2. In addition, the stitch bonded nonwoven 2 preferably has a thickness D1 in the range of 1.2 mm to 1.4 mm. In a particularly advantageous embodiment, the sewing threads 5 are stitched in with a fineness of F 14. A percentage of the fibers 3, 4 or all of the fibers 3, 4 are preferably made in part or completely of plastic, preferably polyethylene terephthalate.

The percentage of long fibers 3 preferably lies in a range of 60% to 80% and accordingly, the percentage of short fibers 4 preferably lies in a range of 40% to 20%. In particular as such, the long fibers 3 have a length L1 in the range of 60 mm to 100 mm, and their length L preferably lies in a range of 70 mm to 80 mm. In an especially preferred embodiment, said length is 76 mm. The short fibers 4 contained in the stitch bonded nonwoven 2 preferably have a fiber length L2 in the range of 35 mm to 55 mm.

The adhesive layer 7 of the adhesive tape 1 preferably includes pressure-sensitive adhesives, in particular based on a polyacrylate, which may be used due to its good aging resistance. As a rule, these acrylic adhesives may be applied either as a dispersion, or as hot melt adhesives that are cured by means of UV radiation. In principle, it is also possible to use acrylates in solvents or to use acrylate monomer mixtures or acrylate prepolymers. These are polymerized and cured after application if needed, either thermally or by means of UV radiation. In addition, it is also possible to use other adhesive class such as adhesives based on synthetic rubber, for example such as SIS (styrene isoprene styrene copolymer) or SSS (styrene butadiene styrene block copolymer), or silicon or polyurethane-based adhesives.

The following Table 3 presents the properties of three different embodiments of the stitch bonded nonwoven 2 according to the invention, each having different sewing threads 5. Here, the indication, "PES Virgin" in Table 3 for the fiber material 3, 4 and the sewing thread 5 means that the fibers 3, 4 and the sewing thread 5 are preferably made of non-recycled polyester.

Accordingly, the indication, "PA" in Table 3 for the material of the sewing thread 5 means that the sewing thread 5 is made of a polyamide. In particular, these sewing threads 5 are made in part of completely of homopolyamides, for example PA 6.6 (PA made of hexamethylenediamine and adipic acid [NH—(CH2)6-NH—CO—(CH2)4-CO]n) or PA 6 (PA made of caprolactam [NH—(CH2)5-CO]n). Homopolyamides are derived from an amino acid or a lactam or, respectively, a diamine and a dicarboxylic acid.

The sewing threads 5 may also be made in part of completely of freshly prepared or recycled polyester (PES), polyamide (PA), polyethylene (PE) or polypropylene (PP), polyurethane (PUR) or even rayon.

TABLE 3

Properties of the stitch bonded nonwovens 2 according to the invention.

|  |  | PET stitch bonded nonwoven 230 g/m² standard | Design 1 84 dtex thread | Design 2 110 dtex thread | Design 3 84 dtex thread PA 6.6 | Design 4 167 dtex thread |
|---|---|---|---|---|---|---|
| fineness | n/25 mm | F 14 | F 14 | F 14 | F 14 | F 14 |
| thread linear density | dtex | 76 | 84 | 110 | 84 | 167 |
| Number of filaments | No. | 36 | 36 | 36 | 36 | 36 |
| Length of stitch | mm | 1.2 | 1.2 | 1.2 | 1.2 | 1.2 |
| Thread material | — | PES Virgin | PES Virgin | PES Virgin | PA 6.6 | PES Virgin |
| Fiber material | — | PES Virgin | PES Virgin | PES Virgin | PES Virgin | PES Virgin |
| Fiber unit Long fibers | dtex | 3.3 | 2.0-5.0 | 2.0-5.0 | 2.0-5.0 | 2.0-5.0 |
| Fiber unit Short fibers | dtex | 6.7 | 5.0-8.0 | 5.0-8.0 | 5.0-8.0 | 5.0-8.0 |
| Fiber length Long fibers | mm | 76 | 76 | 76 | 76 | 76 |
| Fiber length Short fibers | mm | 51 | 51 | 51 | 51 | 51 |
| Percentage of long fibers | % | 60-80 | 60-80 | 60-80 | 60-80 | 60-80 |
| Percentage of short fibers | % | 40-20 | 40-20 | 40-20 | 40-20 | 40-20 |
| Thread weight | g/m² | 230 +/− 20 | 230 +/− 20 | 230 +/− 20 | 230 +/− 20 | 230 +/− 20 |
| Thickness | mm | 1.2-1.4 | 1.2-1.4 | 1.2-1.4 | 1.2-1.4 | 1.2-1.4 |
| Elongation at break | % | 15-30 | 20-35 | 25-40 | 20-40 | 25-50 |
| Tensile strength | N/cm | 35-45 | 45-55 | 50-65 | 65-95 | 65-75 |
| Tear propagation resistance | mN | 25,000 | 30,000 | 35,000 | cannot be measured | cannot be measured |
| Can be torn manually | LV 312 | not applicable | not applicable | not applicable | not applicable | not applicable |

In a first exemplary embodiment, the adhesive tape 1 according to the invention has sewing threads 5 having a thread linear density of 84 dtex. This stitch bonded nonwoven 2 corresponds to design 1, 84 dtex thread in column 4 of the Table 3. For a stitch bonded nonwoven 2 of this kind, the elongation at break preferably lies in a range of 20% to 35%. In particular, the tensile strength lies in a range of 45 N/cm to 55 N/cm. The tear propagation resistance advantageously lies in a range of 30,000 mN. As such, the stitch bonded nonwoven 2 preferably cannot be torn manually. The use of the exemplary stitch bonded nonwoven 2 results in an adhesive tape 1 having the features as specified in the following Table 4, Column 4.

bonded nonwoven 2 results in an adhesive tape 1 having the properties presented in Table 4, column 5.

In the case of the adhesive tape 1 having the stitch bonded nonwoven Design 2, the carrier material has a grammage of 230 g/m2, and the adhesive application lies in the range of

TABLE 4

Properties of the adhesive tapes.

|  |  | Standard adhesive tape 8579X | Adhesive tape of Design 1 84 dtex thread | Adhesive tape of Design 2 110 dtex thread | Adhesive tape of Design 3 84 dtex thread PA 6.6 | Adhesive tape of Design 4 167 dtex thread |
|---|---|---|---|---|---|---|
| Carrier material | g/m² | 230 | 230 | 230 | 230 | 230 |
| Type of adhesive | — | Acrylate | Acrylate | Acrylate | Acrylate | Acrylate |
| Adhesive application | g/m² | 100-150 | 100-150 | 100-150 | 100-150 | 100-150 |
| Thickness | mm | 1.5-1.8 | 1.5-1.8 | 1.5-1.8 | 1.5-1.8 | 1.5-1.8 |
| Elongation at break | % | 25 | 30-40 | 28-42 | 25-42 | 28-45 |
| Tensile strength | N/cm | 47-52 | 55-65 | 71-79 | 80-95 | 82-98 |
| Adhesive strength on steel | N/cm | 5.3 | 5.4 | 5.2 | 5.4 | 5.3 |
| Adhesive strength reverse side of the tape | N/cm | 4.5 | 4.4 | 4.3 | 4.3 | 4.4 |
| Unwinding force | N | 5.5 | 5.6 | 5.5 | 5.3 | 5.5 |
| Ability to be torn manually | LV 312 | not applicable | not applicable | not applicable | not applicable | not applicable |
| Noise reduction rating | LV 312 | D | D | D | D | D |
| Abrasion resistance LV 312 | rub cycles | 1,200-1,500 | 1,700-2,100 | 4,700-5,100 | 5,500-6,100 | 6,300-7,400 |
| Abrasion resistance rating | LV 312 | D | D | D-E | D-E | D-E |

As such, in particular with a carrier material having a grammage of 230 g/m2 and an adhesive application of 100 g/m2 to 150 g/m2, the adhesive tape 1 of Design 1 has an elongation at break of 30% to 40%. The tensile strength lies in a range of 55 N/cm to 65 N/cm. In particular, the tensile strength is greater than 98 N/cm, preferably in a range of 115 N/cm to 125 N/cm, wherein the elongation at break is preferably 60%. The adhesive strength on steel lies at 5.4 N/cm, and the adhesive strength on the reverse side of the tape lies at 4.4 N/cm. An unwinding force of 5.6 N must be applied in order to unwind the adhesive tape 1 from the tape roll. As such, the adhesive tape 1 cannot be torn manually. The noise reduction lies in the Class D range. The abrasion resistance also lies in the Class D range, which corresponds to a range of 1,700 rub cycles to 2100 rub cycles. In a second exemplary embodiment, the adhesive tape 1 according to the invention has sewing threads 5 having a thread linear density of 110 dtex. This stitch bonded nonwoven 2 corresponds to Design 2, 110 dtex thread in column 5 of Table 3. The elongation at break for a stitch bonded nonwoven 2 of this kind lies in a range of 25% to 40%. The tensile strength lies in a range of 50 N/cm to 65 N/cm. The tear propagation resistance lies at 35,000 mN. As such, the stitch bonded nonwoven 2 cannot be torn manually. The use of the stitch 100 g/m2 to 150 g/m2. The adhesive tape has an elongation at break of 28% to 42%. The tensile strength lies in a range of 71 N/cm to 79 N/cm.

The adhesive strength on steel preferably lies at 5.2 N/cm and the adhesive strength on the reverse side of the tape lies at 4.3 N/cm. An unwinding force of 5.5 N must be applied in order to unwind the adhesive tape 1 from the tape roll. The adhesive tape 1 cannot be torn manually. The noise reduction lies in the Class D range. The abrasion resistance lies in the Class D to Class E range. This corresponds to approximately 4,700 rub cycles to 5,100 rub cycles.

As such, in the case of stitch bonded nonwovens 2 of Design 1 and Design 2, sewing threads 5, which are formed from polyester, are advantageously used.

In the case of the stitch bonded nonwoven 2 of Design 3, a sewing thread 5 made of polyamide is used.

Design 3, Table 4 corresponds to a third exemplary embodiment. As such, the adhesive tape 1 according to the invention has sewing threads 5 having a thread linear density of 84 dtex. This stitch bonded nonwoven 2 corresponds to Design 3, 84 dtex thread in column 6 of Table 3. In the case of a stitch bonded nonwoven 2 of this kind, the elongation at break lies in a range of 20% to 40%. The tensile strength lies in a range of 65 N/cm to 95 N/cm. The tear propagation resistance lies in a range that cannot be measured. The stitch bonded nonwoven 2 cannot be torn manually. The use of the stitch bonded nonwoven 2 results in as adhesive tape 1 having the features as specified in Table 4, Column 6.

As such, with a carrier material having a grammage of 230 g/m2 and an adhesive application of 100 g/m2 to 150 g/m2, the adhesive tape 1 of Design 4 has an elongation at break of 28% to 45%. The tensile strength lies in a range of 80 N/cm to 95 N/cm. The adhesive strength on steel lies at 5.4 N/cm, and the adhesive strength on the reverse side of the tape lies at 4.3 N/cm. An unwinding force of 5.3 N must be applied in order to unwind the adhesive tape 1 from the tape roll. The adhesive tape 1 cannot be torn manually. Die noise reduction lies in the Class D range. The abrasion resistance lies in the Class D to Class E range. This corresponds to approximately 5500 rub cycles to 6100 rub cycles.

In a fourth exemplary embodiment, which corresponds to Design 4, 167 dtex thread, the adhesive tape 1 according to the invention has sewing threads 5 having a thread linear density of 167 dtex. Sewing threads 5 made of polyester are used. The properties of this stitch bonded nonwoven 2 are presented in column 7 of Table 3. In the case of a stitch bonded nonwoven 2 of this kind, the elongation at break lies in a range of 25% to 50%. The tensile strength lies in a range of 65 N/cm to 75 N/cm. The tear propagation resistance lies in a range that cannot be measured. The stitch bonded nonwoven 2 cannot be torn manually. The use of the stitch bonded nonwoven 2 results in as adhesive tape 1 having the features as specified in Table 4, Column 7.

As such, with a carrier material having a grammage of 230 g/m2 and an adhesive application of 100 g/m2 to 150 g/m2, the adhesive tape 1 of Design 4 has an elongation at break of 28% to 45%. The tensile strength lies in a range of 82 N/cm to 98 N/cm. The adhesive strength on steel lies at 5.3 N/cm, and the adhesive strength on the reverse side of the tape lies at 4.4 N/cm. An unwinding of 5.5 N must be applied in order to unwind the adhesive tape 1 from the tape roll. The adhesive tape 1 cannot be torn manually. The noise reduction lies in the Class D range. The abrasion resistance lies in the Class D to Class E range. This corresponds to approximately 6,300 rub cycles to 7,400 rub cycles.

While the above description constitutes the preferred embodiment of the present invention, it will be appreciated that the invention is susceptible to modification, variation and change without departing from the proper scope and fair meaning of the accompanying claims.

The invention claimed is:

1. An adhesive tape comprising a carrier having a stitch bonded nonwoven and an adhesive layer applied to one side of the carrier,
    wherein the stitch bonded nonwoven consists of fibers and sewing threads forming a fiber structure, the sewing threads having a thread linear density between 84 dtex and 167 dtex and being sewn through the fibers and stitched into the fibers with a stitch length between 1.0 mm and 1.6 mm,
    wherein the fibers comprise long fibers having a fiber length $L_1$ between 60 mm and 120 mm and short fibers having a fiber length $L_2$ between 35 mm and 55 mm,
    wherein a percentage of the long fibers is between 60% and 80%, and a percentage of the short fibers is between 20% and 40%,
    wherein the long fibers and short fibers are only bonded by mechanical attachment by stitch bonding within the fiber structure, except of a bonding by adhesive in the tape.

2. The adhesive tape according to claim 1, wherein at least some of the sewing threads are made in part or completely of polyamide.

3. The adhesive tape according to claim 1, wherein at least some of the sewing threads are made in part or completely of polyester (PES).

4. The adhesive tape according to claim 1, wherein the sewing threads are stitched into the stitch bonded nonwoven with a fineness between F 14 and F 22.

5. The adhesive tape according to claim 1, wherein the adhesive tape has an abrasion resistance that is greater than 1500 rub cycles in accordance with standard LV 312.

6. The adhesive tape according to claim 1, wherein the adhesive tape has a Class D noise reduction rating in accordance with standard LV 312.

7. The adhesive tape according to claim 1, wherein the adhesive tape has a tensile strength between 55 N/cm and 120 N/cm in accordance with standard LV 312.

8. The adhesive tape according to claim 1, wherein the stitch bonded nonwoven has a tear propagation resistance of at least 30000 mN in accordance with standard LV 312.

9. The adhesive tape according to claim 1, wherein the stitch bonded nonwoven has an elongation at break between 20% and 60% in accordance with standard LV 312.

10. The adhesive tape according to claim 1, wherein the stitch bonded nonwoven has a tensile strength between 45 N/cm and 120 N/cm in accordance with standard LV 312.

11. The adhesive tape according to claim 1, wherein at least some of the fibers of the stitch bonded nonwoven are made in part or completely of polyester (PES).

12. The adhesive tape according to claim 1, wherein the long fibers have a fiber linear density between 2 dtex and 5 dtex.

13. The adhesive tape according to claim 1, wherein the short fibers have a fiber linear density between 5 dtex and 8 dtex.

14. The adhesive tape according to claim 1, wherein the stitch bonded nonwoven has a grammage between 200 g/m$^2$ and 260 g/m$^2$.

15. The adhesive tape according to claim 1, wherein the stitch bonded nonwoven has a thickness between 1.0 mm and 1.6 mm.

16. The adhesive tape according to claim 1, wherein the adhesive layer has an application weight between 100 g/m$^2$ and 150 g/m$^2$.

17. The adhesive tape according to claim 1, wherein the adhesive layer comprises pressure-sensitive adhesives.

18. The adhesive tape according to claim 1, wherein the adhesive tape has an elongation at break between 25% and 45% in accordance with standard LV 312.

19. The adhesive tape according to claim 1, wherein the adhesive layer comprises a UV-cured polyacrylate.

20. An adhesive tape comprising a carrier having a stitch bonded nonwoven and an adhesive layer applied to one side of the carrier,
    wherein the stitch bonded nonwoven consists of fibers and sewing threads forming a fiber structure, the sewing threads having a thread linear density between 84 dtex and 167 dtex and being sewn through the fibers and stitched into the fibers with a stitch length between 1.0 mm and 1.6 mm,
    wherein the fibers comprise long fibers having a fiber length $L_1$ between 60 mm and 120 mm and short fibers having a fiber length $L_2$ between 35 mm and 55 mm,
    wherein a percentage of the long fibers is between 60% and 80%, and a percentage of the short fibers is between 20% and 40%, wherein the long fibers and short fibers are only bonded by mechanical attachment by stitch bonding within the fiber structure, except of a bonding by adhesive in the tape;

wherein all threads are made from the same material and completely consist of a polyamide or a polyester.

\* \* \* \* \*